(12) United States Patent
Robinson

(10) Patent No.: US 6,718,866 B1
(45) Date of Patent: Apr. 13, 2004

(54) COOKING GRILL LINERS

(76) Inventor: Darin Thomas Robinson, 1757 S. Oval Dr., Sarasota, FL (US) 34236

( * ) Notice: Subject to any disclaimer, the term of this patent is extended or adjusted under 35 U.S.C. 154(b) by 0 days.

(21) Appl. No.: 10/349,343

(22) Filed: Jan. 22, 2003

(51) Int. Cl.[7] .............................. A47J 27/00; A47J 37/00
(52) U.S. Cl. .............................. 99/445; 99/444; 99/446
(58) Field of Search ........................... 99/444–446, 447, 99/448, 449, 372–384, 481, 483, 450, 645; 126/41 R, 25 R, 39 M, 145, 9 A; 220/573.4, 573.1, 574.3, 495.03, 912

(56) References Cited

U.S. PATENT DOCUMENTS

| | | | | |
|---|---|---|---|---|
| 1,301,598 A | * | 4/1919 | Patton | 220/574.3 |
| 2,323,356 A | * | 7/1943 | Rosay | 220/574.3 |
| 3,076,579 A | * | 2/1963 | Kuhlman | 220/574.3 |
| 3,601,280 A | * | 8/1971 | Mills | 220/672 |
| 3,780,871 A | * | 12/1973 | Hicks et al. | 210/471 |
| 3,828,966 A | * | 8/1974 | Martin | 220/7 |
| 4,184,421 A | | 1/1980 | Ahlgren | |
| 4,320,699 A | | 3/1982 | Binks | |
| 4,794,052 A | | 12/1988 | Morrison | |
| 5,046,633 A | * | 9/1991 | Chung | 220/574.3 |
| 5,279,277 A | | 1/1994 | Barker | |
| 5,447,097 A | | 9/1995 | Rhee | |
| 5,586,491 A | | 12/1996 | Diller | |
| 5,613,427 A | * | 3/1997 | Wiley | 99/446 |
| 6,101,931 A | | 8/2000 | Miklos | |
| 6,313,446 B1 | | 11/2001 | Jones | |
| 6,457,601 B1 | | 10/2002 | Chappel | |

* cited by examiner

Primary Examiner—Timothy F. Simone
(74) Attorney, Agent, or Firm—Charles J. Prescott

(57) ABSTRACT

Disposable electric cooking grill liners for protecting an electric cooking grill having a heated grilling surface of each of the pivotally connected moveable and stationary grilling members. Each grilling surface is heated and has raised cooking ribs wherein both sides of food placed between the closed grilling surfaces are simultaneously heated. Each grill liner is formed of an unperforated sheet of semi-rigid or heavy aluminum foil preformed for fitting directly against and substantially conforming to and covering the corresponding grilling surface whereby cooking heat provided to each grilling surface is substantially transferred through the grilling liner without food and juices flowing therefrom coming in contact with the grilling surfaces. Each grill liner also has a rigidized outturned margin formed of multiple layers of foil folded over on itself for maintaining the preformed shape during installation, use and removal of each said grill liner after use.

4 Claims, 4 Drawing Sheets

COOKING GRILL LINERS

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to the field of grill and barbecue-type cooking and more particularly to disposable preformed aluminum foil cooking grill liners which substantially conform to and mate against the opposing grilling surfaces of well known electric grilling appliances.

2. Description of Related Art

Electric cooking grills having both a stationary and a moveable heated grilling surface pivotally connected together have become quite popular. One such device bears the trademark "GEORGE FOREMAN" grills having electric heat provided to both stationary and pivotably moveable grilling surfaces so that cooking heat is applied to both the top and bottom surfaces of food placed therebetween. These GEORGE FOREMAN-type grills also include an inclined orientation of the stationary or lower grilling surface with raised ribs extending longitudinally downwardly from the higher to the lower ends so that cooking juices including undesirable fat material will drain downwardly toward and outwardly from a downturned juice draining margin disposed at the lowest point of the stationary grilling surface.

The popularity of these GEORGE FOREMAN-type grills and others of a similar configuration and nature have become extremely popular and are found in a broad variety of sizes and forms. However, a common thread is the stationary and preferably inclined cooking surface and the pivotally moveable or openable upper grilling surface which come together to inject heat from both top and bottom sides of the food to be cooked. However, cleaning of these grilling surfaces is somewhat problematic. These grilling surfaces are generally not removable and therefore, to the extent required, cleaning must be done dealing with the entire cooking grill itself which may include non-water proof delicate portions which cannot be submerged or exposed to extensive quantities of water.

Instructions accompanying the use of these GEORGE FOREMAN grills specifically advise that cleaning with a wet sponge or disposable toweling immediately after cooking is completed will greatly expedite and facilitate the cleaning process of the grilling surfaces and will obviate the need for more aggressive soap and water scrubbing otherwise. Human nature being as it is, this recommended cleaning step immediately after cooking is typically ignored based, in all likelihood, on the uncontrollable urge to immediately begin consuming the newly-cooked food.

These grilling surfaces, when left to cool with food particles and juices remaining thereon are extremely difficult to clean. A mere sponge or wet paper towel wiping no longer suffices and more aggressive techniques for cleaning and scouring these grilling surfaces must be used.

The following U.S. patents are generally related to this area of grill cooking and protection thereof but all have structural and functional features which are substantially differing from that of the present invention.

U.S. Pat. No. 5,586,491 to Diller, et al.
U.S. Pat. No. 5,447,097 to Rhee
U.S. Pat. No. 4,320,699 to Binks
U.S. Pat. No. 4,794,052 to Morrison
U.S. Pat. No. 6,101,931 to Miklos
U.S. Pat. No. 6,547,601 to Chappell
U.S. Pat. No. 6,313,446 to Jones
U.S. Pat. No. 4,184,421 to Ahlgren
U.S. Pat. No. 5,279,277 to Barker The present invention provides disposable cooking grill liners which are preformed to specifically fit and easily mate against and conform to each of the stationary and moveable grilling surfaces of a GEORGE FOREMAN-type grill. Moreover, by the very nature of this close fitting alignment, the grill liner for the movable upper grilling surface will remain in place when opened. These cooking grill liners are formed of heavier aluminum foil having doubled over rigidized outturned or upturned margins which aid in maintaining the overall preformed shape for mating alignment and fitting against each of the grilling surfaces and also facilitate the handling and disposal thereof after use.

BRIEF SUMMARY OF THE INVENTION

This invention is directed to a pair of disposable electric cooking grill liners for protecting the grilling surfaces of an electric cooking grill having two pivotally connected heated grilling members. Each grilling surface has raised cooking ribs and is heated and wherein both sides of food placed between the closed grilling surfaces are simultaneously heated. Each grill liner is formed of an unperforated sheet of semi-rigid or heavy aluminum foil preformed for fitting directly against and substantially conforming to and covering the corresponding grilling surface whereby cooking heat provided to each grilling surface is substantially transferred through the grilling liner. Food and juices flowing therefrom do not come in contact with the grilling surfaces thereby. Each grill liner also has a rigidized outturned and preferably reversed margin formed of multiple layers of foil folded over on itself for maintaining the preformed shape during installation, use and removal of each said grill liner after use.

It is therefore an object of this invention to provide a disposable cooking grill liner for each of the grilling or cooking surfaces of a GEORGE FOREMAN-type grill.

Still another object of this invention is to substantially eliminate the need for cleaning grilling surfaces of electric cooking grills having matable lower stationary and upper pivotably openable grilling surfaces each of which are electrically heated for rapid cooking of both sides of food placed there between.

In accordance with these and other objects which will become apparent hereinafter, the instant invention will now be described with reference to the accompanying drawings.

BRIEF DESCRIPTION OF THE SEVERAL VIEWS OF THE DRAWING(S)

DETAILED DESCRIPTION OF THE INVENTION

Figure 1:
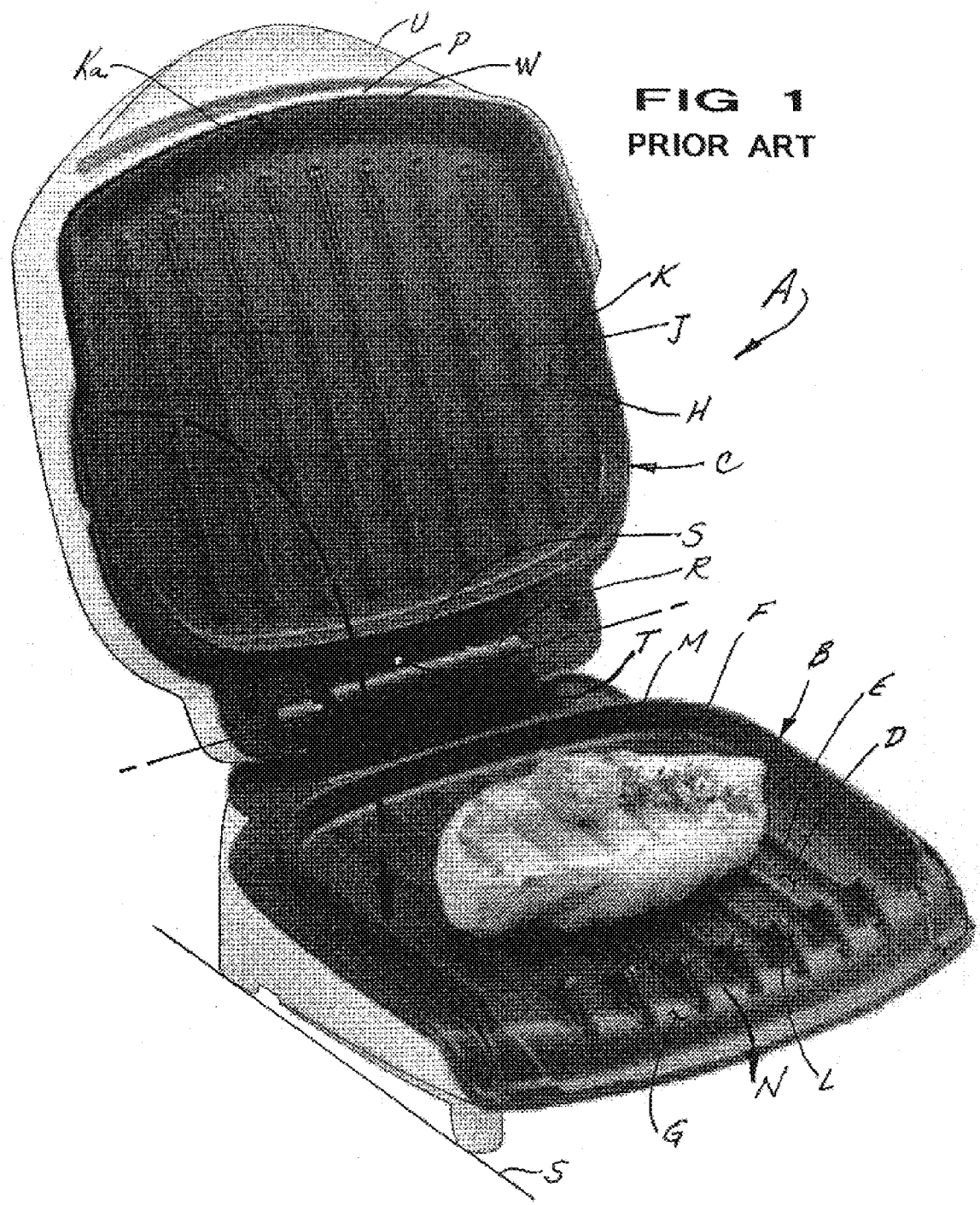
FIG. 1 is a perspective view of a prior art GEORGE FOREMAN-type grill with the moveable or upper grilling surface in the open position.

Referring now to the drawings, and firstly to FIG. 1, a typical prior art electric cooking grill for use in conjunction with the present invention is there shown generally at letter A. This cooking grill A, commonly known under one trademark as a GEORGE FOREMAN grill, includes a stationary lower grilling member B and a moveable upper grilling member C which are pivotally connected together about a horizontal axis shown and pivotable in the direction of the arrow to a closed position atop a piece of food placed atop a stationary lower grilling surface D of the stationary member B.

The stationary grilling member B includes a cooking or grilling surface D having spaced parallel cooking ribs E upwardly extending therefrom. An upturned perimeter or flange F is provided to retain splattering juice and heat when the moveable cooking member C is closed atop the food.

The stationary grilling member B has a support structure so that, when placed atop a horizontal surface S, the grilling surface D is slightly inclined toward the lowest margin G of the grilling surface D whereby unwanted cooking juices will flow over and downwardly therefrom into a collector (not shown).

The moveable upper grilling member C also includes a grilling surface H and longitudinally extending spaced parallel ribs J which opposingly mate with the ribs E of the stationary grilling member B. A downturned flange or perimeter K is provided to opposingly mate with the upturned flange F to substantially confine both splattering juices and heat between the grilling surfaces H and D.

When this cooking grill A is in use, electrical current activates electric heating elements (not shown) within each of the stationary and moveable grilling members B and C to effect cooking of the food from both top and bottom of the food surfaces for more uniform, expedited cooking.

Referring now to FIGS. 2 to 5, the present invention is there shown generally at numerals 10 and 12. Each of these disposable grill liners 10 and 12 are preformed from semi-rigid or heavier aluminum foil preferably having a thickness in the range of 0.003"(3 mils) or even greater. Typically, lightweight aluminum foil having a thickness of 0.001"(1 mil) may also be used but the enhanced flexibility of lightweight foil for other uses makes the heavier, more rigid aluminum foil preferred.

Each of the grill liners 10 and 12 is preformed having longitudinal ribs 16 and 26, respectively, and valleys 14 and 30 having a cross sectional configuration creating mating heated surfaces 22 and 34 which substantially and closely mate against, align with, and cover these corresponding cooking ribs E and J of the cooking surfaces D and H as previously described.

Each of the grill liners 10 and 12 also includes upturned perimeter walls 21 and 32, respectively, which are also preformed to closely mate against the side walls or flanges F and K, respectively. Note the importance of the closely mating preformed configuration of these disposable grill liners 10 and 12 against the heated cooking surfaces D and H, respectively, which serves to insure not only the proper fitting and positioning of these grill liners 10 and 12 during use, but also helps to insure better heat transfer from the grilling surfaces D and H without excess heat loss or heat transfer loss, and retention of the upper grill liner 12 when the movable upper grill member C is opened after cooking is complete.

Figure 4:
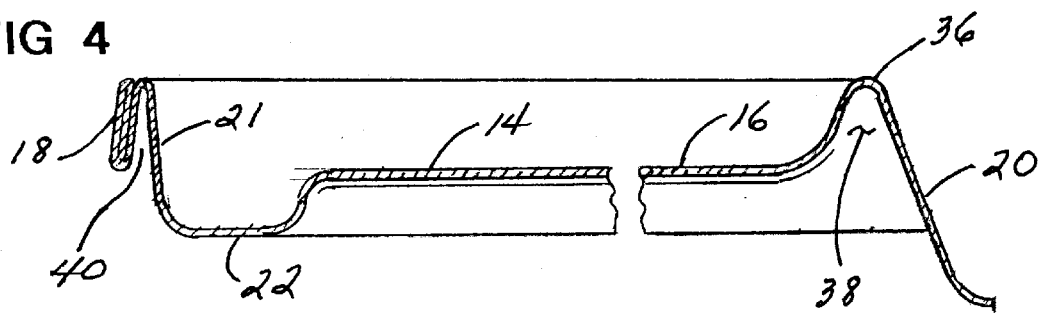
FIG. 4 is a section view in the direction of arrows 4—4 in FIG. 2.
Figure 3:
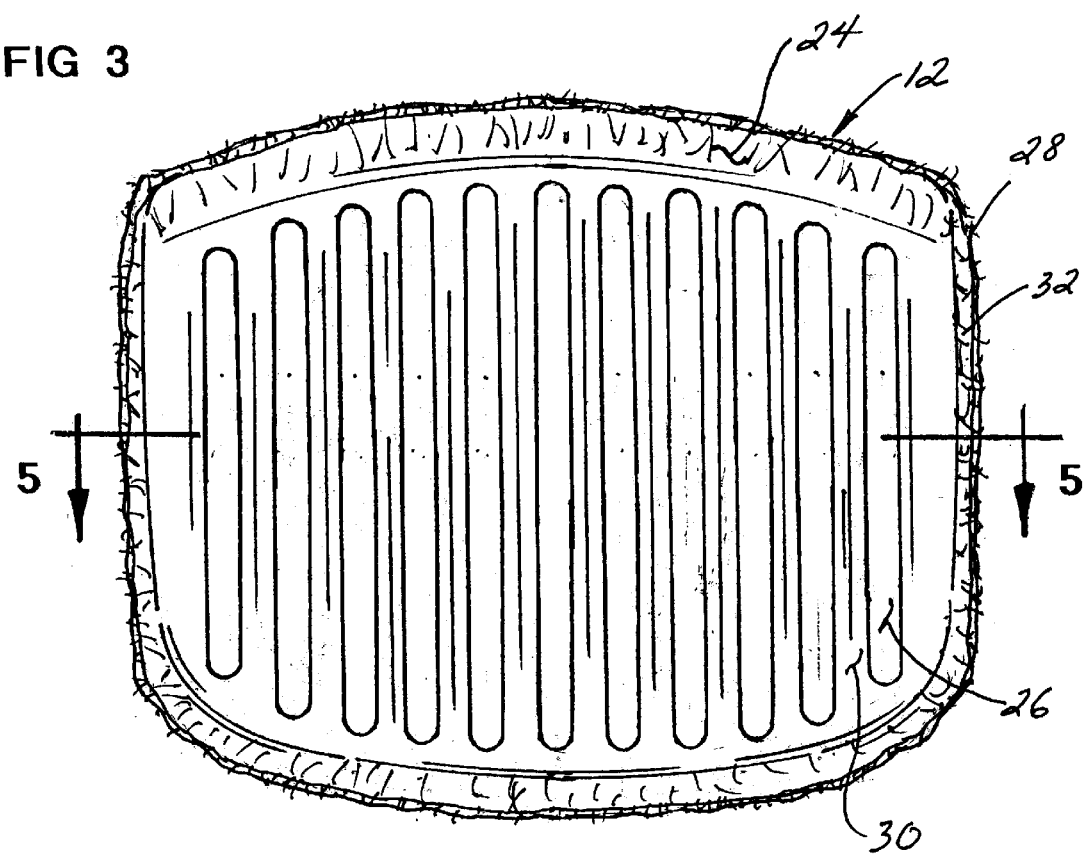
FIG. 3 is a top plan view of the preferred cooking grill liner of the present invention shown in FIG. 2 covering the moveable upper grilling surface.
Figure 5:
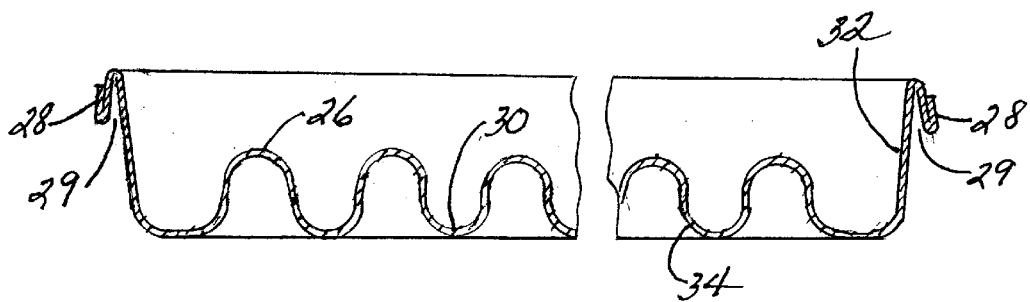
FIG. 5 is an interrupted section view in the direction of arrows 5—5 in FIG. 3.

Rigidized perimeter flanges best seen in FIGS. 4 and 5 at 18 and 28 are also provided and formed of doubled layers of the perimeter material which grip the flanges F and K at 40 and 29, respectively, of each of the grill liners 10 and 12. These rigid perimeters 18 and 28 further enhance the shape-keeping abilities of the relatively lightweight aluminum foil used to fabricate the preformed grill liners 10 and 12. Note that these rigid outer margins 18 and 28 must be configured so as not to inhibit the closure of the grilling surfaces D and H; however, the thickness of the food typically maintains these grilling surfaces D and H spaced apart so that the rigidizing perimeters 18 and 28 may extend over the edges of the side walls F and K.

Figure 2:
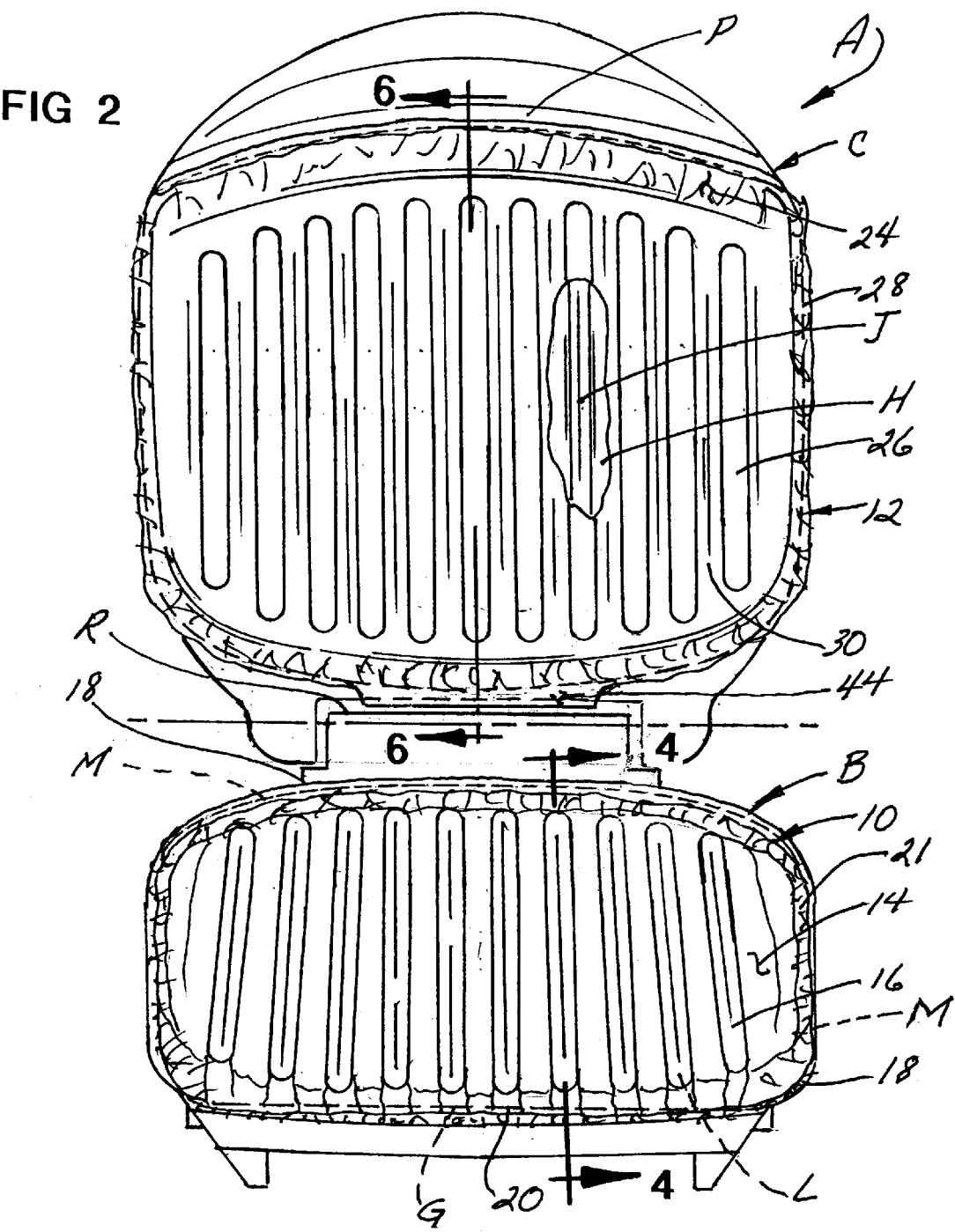
FIG. 2 is a front elevation broken view of the cooking grill shown in FIG. 1 with a disposable electric cooking grill liner fitted over and covering each of the grilling surfaces.

The grill liner 10 utilized to cover the stationary lower grilling surface D also includes a downturned flange as best seen in FIGS. 2 and 4 at 20 so that the inner mating surface 22 against the corresponding downturned drainage surface G in FIG. 1 will allow the food juices to flow thereover without substantial contact with this portion G of the grilling surface D.

Obviously, after use and cooled, each of the disposable grill liners 10 and 12 may be easily removed aided by grasping of the rigidized perimeters or margins 18 and 28 for proper disposal thereafter leaving the grilling surfaces D and H substantially clean for reuse.

Figure 6:
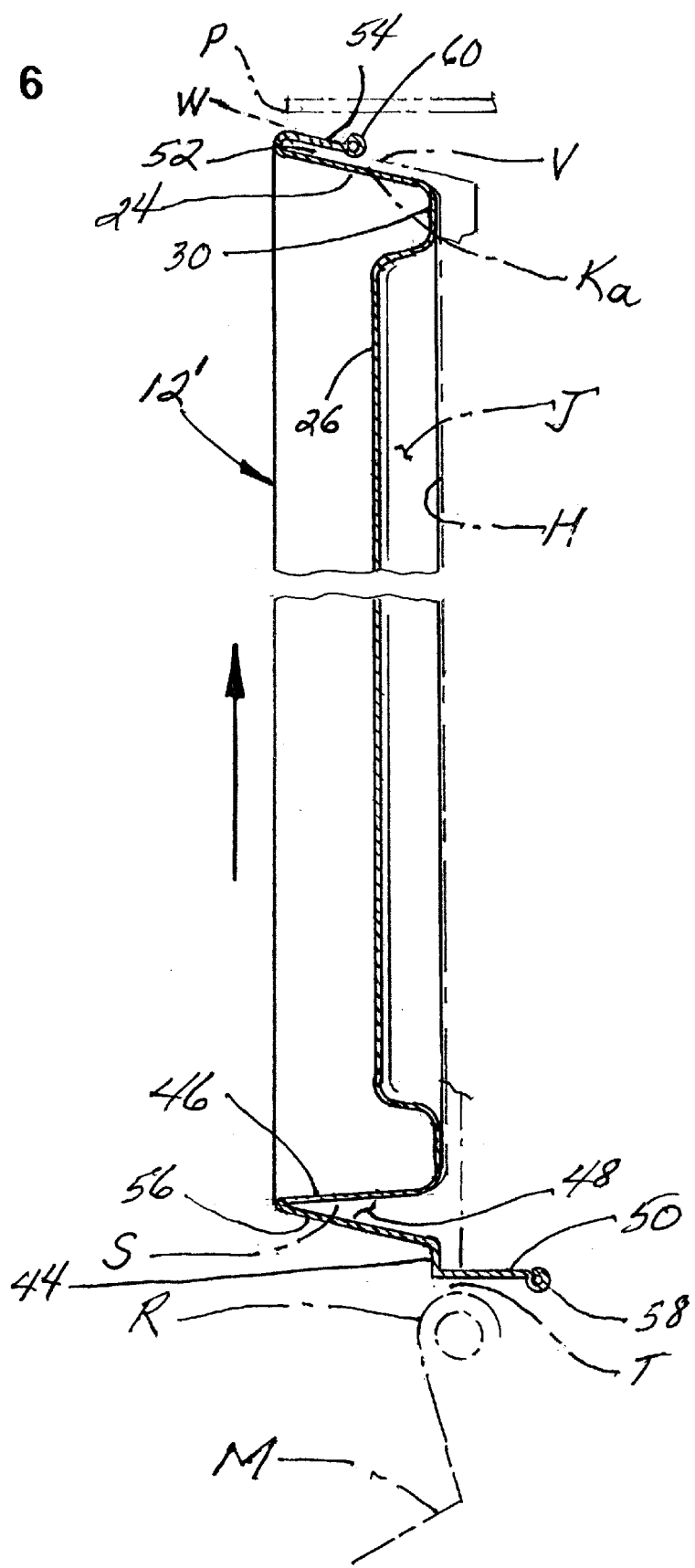
FIG. 6 is a modified section view in the direction of arrows A—A in FIG. 2 showing an alternate and preferred embodiment 12' of the invention.

Referring now to FIGS. 1 and 6, an alternate and preferred embodiment of the grill liner 12' for the moveable grilling member C is there shown. Most of the mating features of this grill liner 12' are substantially similar to those described with respect to the grill liner 12 shown, and are numbered the same as in FIGS. 2, 3, 5 and 6 and the detailed description thereof is hereby repeated by reference. However, it has been determined that the retention in place of the grill liner 12 may be compromised if the groove 29 as shown in FIG. 5 which matably engages over the tapered flange K does not apply sufficient resilient frictional gripping pressure therearound.

To resolve this issue of less than fully reliable retention of the grill liner 12 against the grilling surface H and flanges K of the moveable cooking member C, the embodiment 12' in FIG. 6 includes an additional reverse flange portion 54 which is substantially doubled over against the back or outer surface V of a distal flange portion Ka of flange K. A slot or gap 52 created by these overlapping flange portions 24 and 54 thus substantially mate against and grip both inner and outer surfaces of the flange K.

This alternate and preferred structure takes advantage of a gap W which exists between the concealed surface V of flange portion Ka and the mating lip P of the top cover U of the moveable cooking member C. Substantial retention force is achieved due to the outwardly sloping nature of flange portion Ka whereby the slot 52 and flange portions 24 and 54 mechanically lock this portion of the grill liner 12' in place as shown.

To further enhance retention of the grill liner 12' when the moveable grilling member C is lowered into or raised from the cooking position, flange 46 is also doubled over at 56 so as to create a tapered slot 48 which matably engages against a proximal flange portion S of flange F of the moveable grilling member C. Additionally, a locking tab 50 extending from the outer portion 56 is provided which slidably engages through slot T between the inner edge of the grilling member C and the pivot shaft housing R of the stationary grilling member B.

During use, to facilitate insertion of this locking tab 50 through slot T, the entire moveable grilling member C may be grasped and moved upwardly in the direction of the arrow in FIG. 6 so as to enlarge this slot T temporarily for easier insertion of this locking tab 50. Thereafter, when released, the slot T reduces to its normal width.

By this arrangement, the preferred embodiment of the grill liner 12' is lockably engaged to the outer flange K, to the inner flange S and within slot T whereby, when the moveable grilling member C is lowered in the direction of the arrow in FIG. 1 for cooking food, or opened, the grill liner 12' remains fully in place against the grilling surface H.

To insure safe handling, a rolled perimeter margin shown at 58 and 60 and along the entire perimeter margin of the grill liner 12' is preferred.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A disposable electric cooking grill liner for protectively covering each of two grilling surfaces of an electric cooking grill having two pivotally connected electrically heated grilling members each having raised cooking ribs wherein both sides of food placed between the closed grilling members are heated to a desired cooking temperature, each of said grill liners comprising:

an unperforated sheet of semi-rigid aluminum foil preformed for fitting over and substantially conforming against and covering the corresponding grilling surface whereby cooking heat provided to each grilling surface is substantially transferred to said grill liner and food and juices flowing from the cooking food are substantially prevented from coming in contact with, and thus soiling, the grilling surfaces;

each said grill liner having a rigidized perimeter margin formed of multiple layers of said foil folded over on itself for substantially maintaining the preformed shape during installation, use and removal of each said grill liner.

2. For an electric cooking grill having stationary and moveably heated grilling members connected together for pivotal movement therebetween by a pivotal connection each grilling member having a cooking surface including raised cooking ribs wherein both sides of food placed between the closed grilling surfaces are heated to a desired cooking temperature, a disposable grill liner for each of the grilling surfaces comprising:

an unperforated sheet of aluminum foil preformed for close mating fitting and substantially covering the corresponding grilling surface whereby cooking heat provided to each grilling surface is substantially transferred through the corresponding said grilling liner to cook the food while substantially preventing food and juices flowing from the cooking food from coming in contact with the grilling surfaces;

each said grill liner having a portion of a perimeter margin thereof rigidized by multiple layers of said foil folded over against itself for maintaining the preformed shape during installation, use and removal of each said grill liner after use;

said grill liner for the grilling surface of the moveable grill member including a narrow slot formed by doubling a distal portion of said perimeter margin to fit over a distal portion of the flange of the moveable grill member and further including a locking tab extending from a proximal portion of said perimeter margin to be inserted into a gap between mating portions of the pivotal connection between the grilling members;

whereby said grill liner for the moveable grilling member is substantially retained in position against the corresponding grilling surface as the moveable grilling member is opened and closed.

3. Disposable electric cooking grill liners for an electric cooking grill having a stationary and a moveable grilling member pivotally connected together, each grilling member having a grilling surface having raised cooking ribs wherein both sides of food placed between the closed grilling surfaces are heated and cooked, the stationary grilling surface also tilted from horizontal and including a downturned juice drainage margin disposed at a lowest point of the stationary grilling surface, each of said grill liners comprising:

an unperforated sheet of semi-rigid aluminum foil preformed for close fitting against and substantially covering the corresponding grilling surface whereby electric cooking heat provided to each grilling surface is substantially transferred to said grilling liner and food and juices flowing therefrom are prevented from coming in contact with the grilling surfaces;

each said grill liner having a rigidized margin covering upturned outer margins of the corresponding grilling surface and being formed of multiple layers of said foil folded over on itself along a perimeter thereof for maintaining the preformed shape during installation, use and removal of each said grill liner after use;

said grill liner for the stationary grilling surface also having a downturned margin which conformingly fits against and covers the juice drainage margin.

4. Disposable grill liners as set forth in claim 3, wherein:

said grill liner for the grilling surface of the moveable grill member including a narrow slot formed by doubling a distal portion of said perimeter margin to fit over a distal portion of the flange of the moveable grill member and further including a locking tab extending from a proximal portion of said perimeter margin to be inserted into a gap between mating portions of the pivotal connection between the grilling members;

whereby said grill liner for the moveable grilling member is substantially retained in position against the corresponding grilling surface as the moveable grilling member is opened and closed.

\* \* \* \* \*